United States Patent [19]

Chelminski

[11] 4,108,271

[45] Aug. 22, 1978

[54] SEISMIC LAND SOURCE

[75] Inventor: Stephen V. Chelminski, West Redding, Conn.

[73] Assignee: Bolt Associates, Inc., Norwalk, Conn.

[21] Appl. No.: 805,522

[22] Filed: Jun. 10, 1977

[51] Int. Cl.² ............................................. G01V 1/04
[52] U.S. Cl. .................................... 181/119; 181/117; 181/120; 181/401
[58] Field of Search ........ 181/113, 401, 402, 117–120; 340/14

[56] References Cited

U.S. PATENT DOCUMENTS

| | | | |
|---|---|---|---|
| 3,310,128 | 3/1967 | Chelminski | 181/119 |
| 3,353,623 | 11/1967 | Flatow et al. | 181/401 |
| 3,439,773 | 4/1969 | Dart et al. | 181/401 |
| 3,480,103 | 11/1969 | Kilmer | 181/117 |
| 3,557,900 | 1/1971 | Kilmer | 181/401 |
| 3,779,335 | 12/1973 | Chelminski | 181/119 |
| 3,800,907 | 4/1974 | Chelminski | 340/17 R |

OTHER PUBLICATIONS

Brochure, "Par Air Gun", Bolt Associates, Norwalk, Conn., 1976.

*Primary Examiner*—Howard A. Birmiel
*Attorney, Agent, or Firm*—Parmelee, Johnson, Bollinger & Bramblett

[57] ABSTRACT

A seismic land source for transmitting powerful seismic energy impulses into the earth comprising a dome-shaped bell within which is contained a substantially incompressible liquid and an air gun which can be fired for abruptly releasing pressurized gas into the liquid in the bell. A metal pan is positioned below the rim of the bell for engaging the surface of the earth below the bell and is mounted for downward movement with respect to the bell. A flexible elastomeric diaphragm extends across the bottom of the bell above the metal pan and extends upwardly beyond the bell rim between the rim and the pan. The diaphragm has a rounded shoulder portion with an upturned peripheral side wall portion extending upwardly around the exterior of the bell to an elevated level substantially above the bell rim, and the upper edge of the peripheral side wall of the diaphragm is clamped at said elevated level to a flange fixed to the outer surface of the bell. A plurality of pneumatic cylinders are arranged to pull upwardly on the rim of the pan to prevent cocking of the pan prior to firing if the pan inadvertently is placed eccentrically on a rock.

20 Claims, 5 Drawing Figures

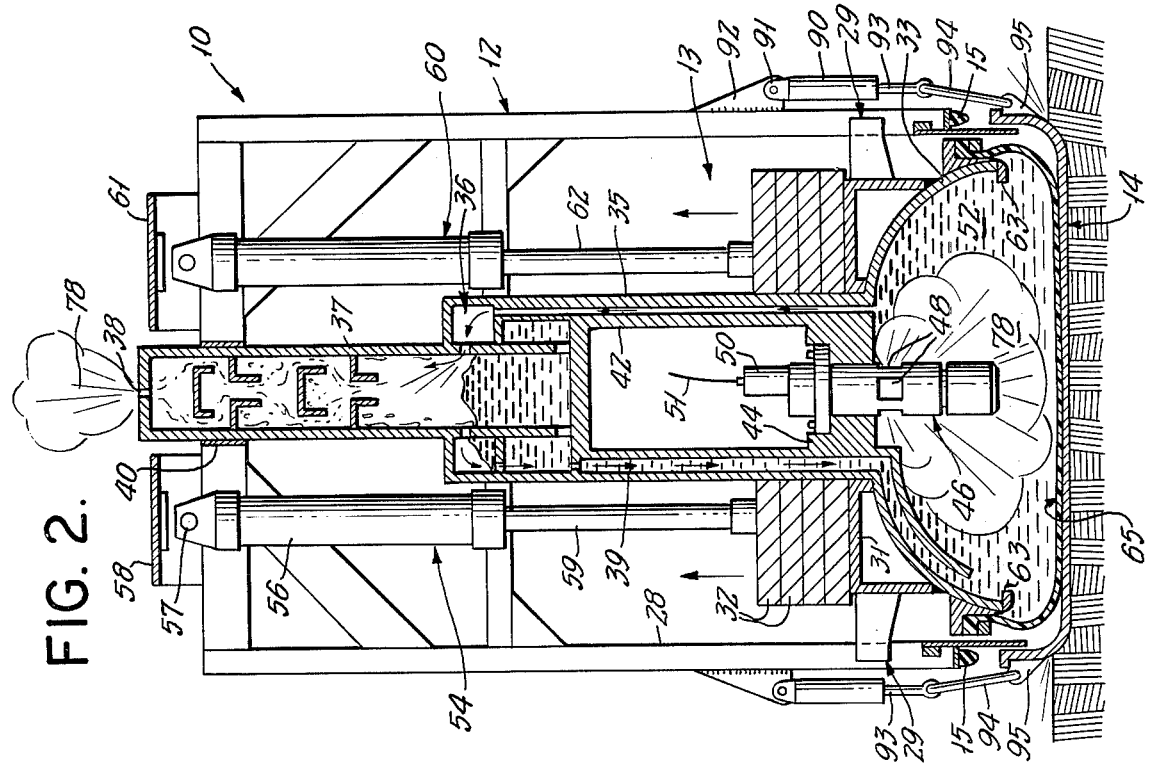
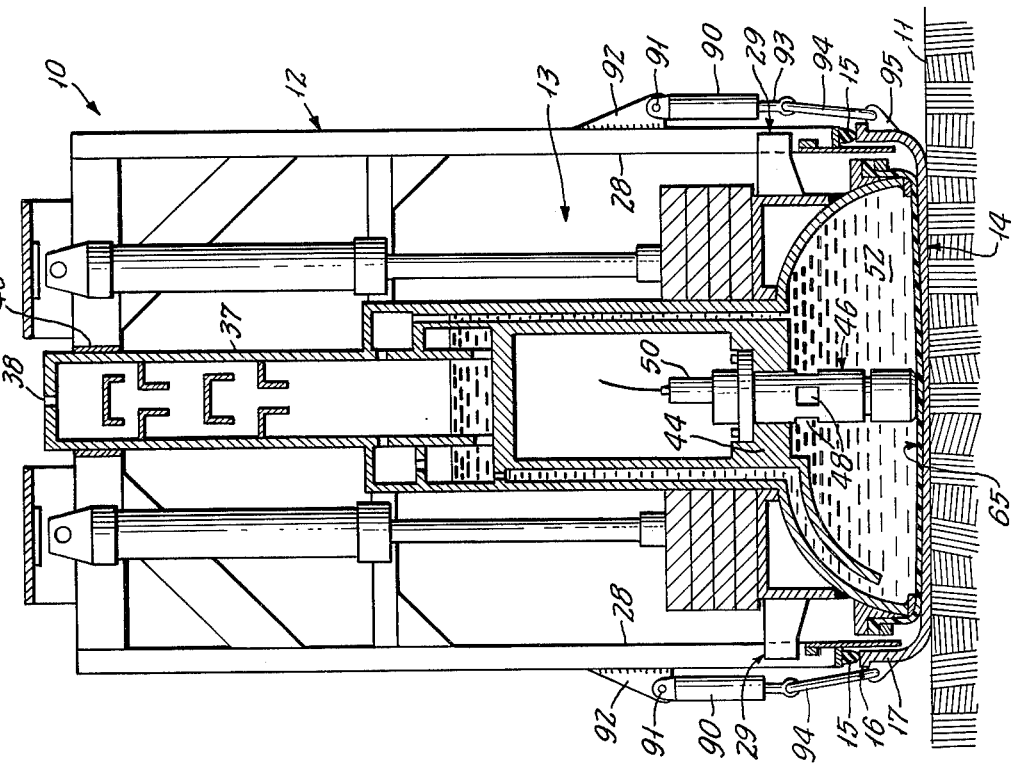

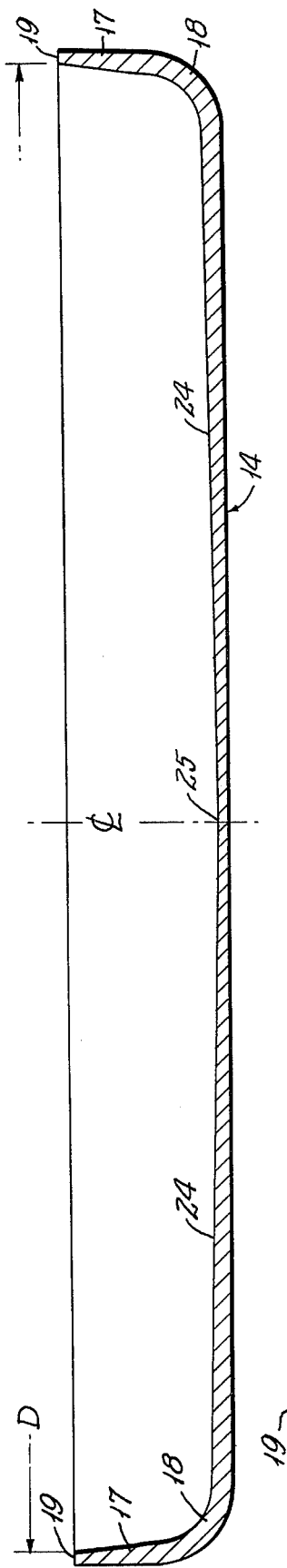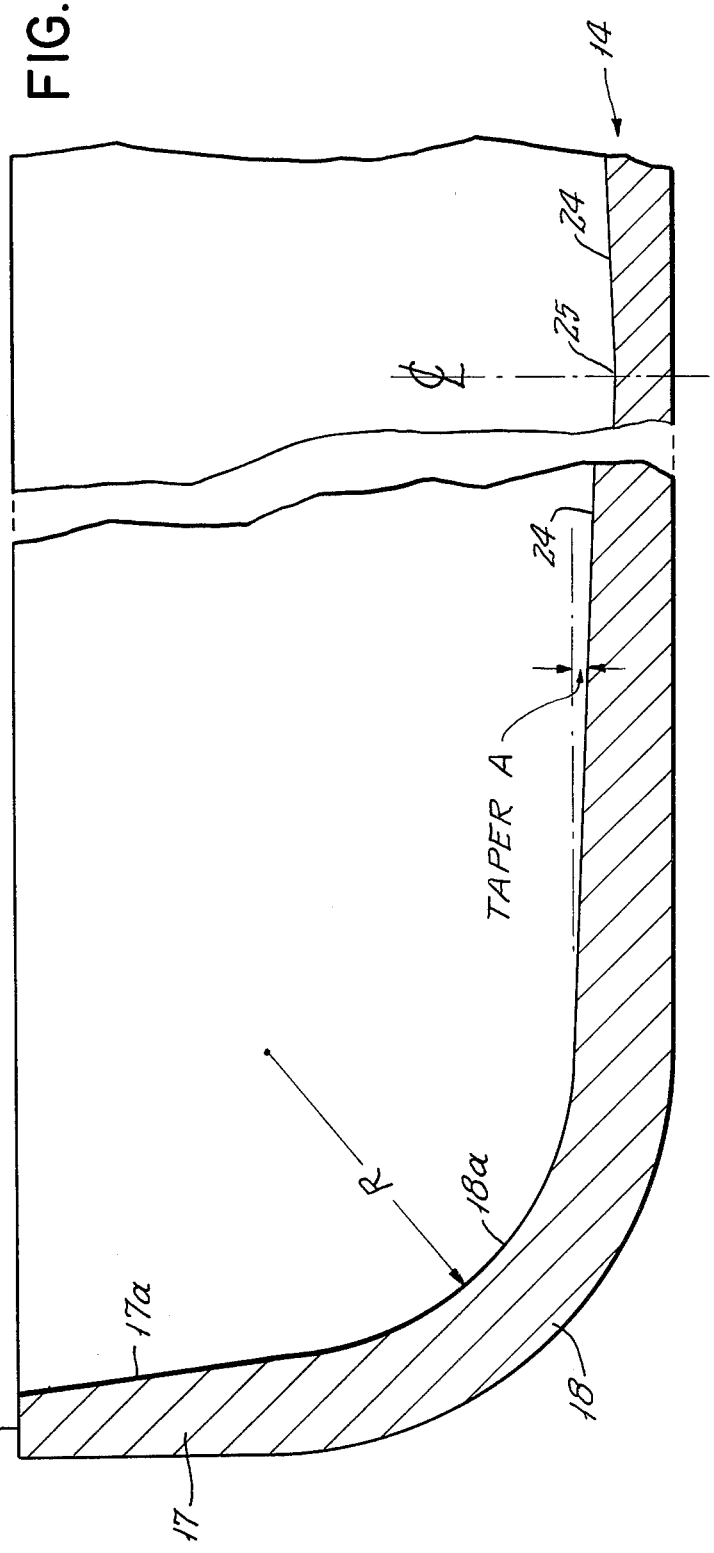

SEISMIC LAND SOURCE

FIELD OF THE INVENTION

The present invention relates to a seismic energy land source for seismic surveying on the earth and particularly to improved apparatus for transmitting powerful seismic energy impulses from a seismic land source into the earth.

BACKGROUND OF THE INVENTION

In seismic exploration for surveying on land intense seismic impulses are transmitted into the earth's surface at a desired site and these impulses may be repeated at frequent intervals. A network of geophones is used to sense and to provide a recording of the results at various points in the ground spaced from the site at which the powerful sound impulses are transmitted into the earth. These geophones are coupled to the earth for receiving the seismic energy which has been reflected and/or refracted by sub-surface geologic strata and various other sub-surface structures in the earth and which then returns toward the surface of the earth, where the geophones pick up the returning energy. In this manner, information is obtained about the conditions and characteristics of the geologic formations in the regions being surveyed. Such seismic surveying can be conducted on land, gravel, rocks, marshland, mud, sand, swamps or in shallow water where the land source can be positioned down against the earth.

Such seismic energy land sources have been constructed in a compact and mobile form wherein the apparatus is provided with a tank which may be in the form of an inverted dome provided with a displaceable diaphragm bottom to enclose therein an incompressible liquid such as water. One or more powerful gas-releasing airguns are positioned within the tank and receive and store pressurized air or other suitable gas under high pressure from a source of pressurized gas such as the high pressure receiver storage tank of a high pressure air-compressor. A metal plate is positioned between the diaphragm and the earth so that upon a very sudden or intensely abrupt release of the high-pressure gas into the liquid the flexible diaphragm will suddenly thrust down on the metal plate to displace a portion of the earth beneath the plate to produce a seismic pulse in the earth.

Detailed information concerning prior mobile seismic energy land sources patented by the present inventor is disclosed in U.S. Pat. Nos. 3,800,907 issued Apr. 2, 1974; 3,779,335 issued Dec. 18, 1973; and 3,310,128 issued Mar. 21, 1967.

SUMMARY OF THE INVENTION

It is among the advantages of this invention that it provides improved apparatus for transmitting powerful seismic energy impulses from a seismic energy land source into the earth for seismic surveying.

It is among the further advantages of this invention in certain of its aspects that it provides an improved seismic impulse transmitting diaphragm for transmitting powerful seismic energy impulses into the earth, a diaphragm which is stronger and capable of a significantly longer operating life.

According to one aspect of the present invention there is disclosed a seismic energy land source having improved apparatus for transmitting powerful seismic energy impulses into the earth. The seismic energy source including this improved seismic pulse transmitting apparatus as shown comprises a rigid dome-shaped bell in which is contained a substantially incompressible liquid, such as water, with at least one airgun positioned in the bell and which may be fired for abruptly releasing pressurized gas into this liquid. A metal pan is positioned below the lower rim of the bell for engaging the surface of the earth below the bell and is mounted for downward movement with respect to the bell after the airgun has been fired. A cup-shaped flexible elastomeric diaphragm extends across the bottom of the bell above the metal pan and extends upwardly beyond the rim of the bell to pass between the rim and the pan. The diaphragm is provided with a rounded shoulder having an upturned peripheral side wall portion which extends upwardly around the exterior of the bell to an elevated level significantly above the rim of the bell. Means are provided for securing the upper edge of this upturned side wall portion to the exterior of the bell at an elevation above said rim. Such means may comprise a clamp ring which clamps the upper edge of the peripheral side wall of the diaphragm against a flange fixed to the outer surface of the bell.

BRIEF DESCRIPTION OF THE DRAWINGS

The various objects, aspects and advantages of the present invention will become more fully understood from the following description of a presently preferred embodiment thereof, when considered in conjunction with the accompanying drawings, in which:

FIG. 1 is a side elevational view with a portion thereof in section of a seismic land source including improved seismic energy impulse transmitting apparatus embodying the present invention and being shown resting upon the earth;

FIG. 2 is a view similar to that of FIG. 1 but showing the changeable relative positions of various components as occurs when a powerful seismic impulse is transmitted into the earth;

FIG. 4 is a transverse sectional view in enlarged scale of the metal pan which is positioned below the elastomeric diaphragm as seen in FIG. 1; and FIG. 5 is a portion of the left end of FIG. 4 but in enlarged scale to show structural details of the upturned peripheral side wall and rounded shoulder of the metal pan.

DETAILED DESCRIPTION

Figure 3:
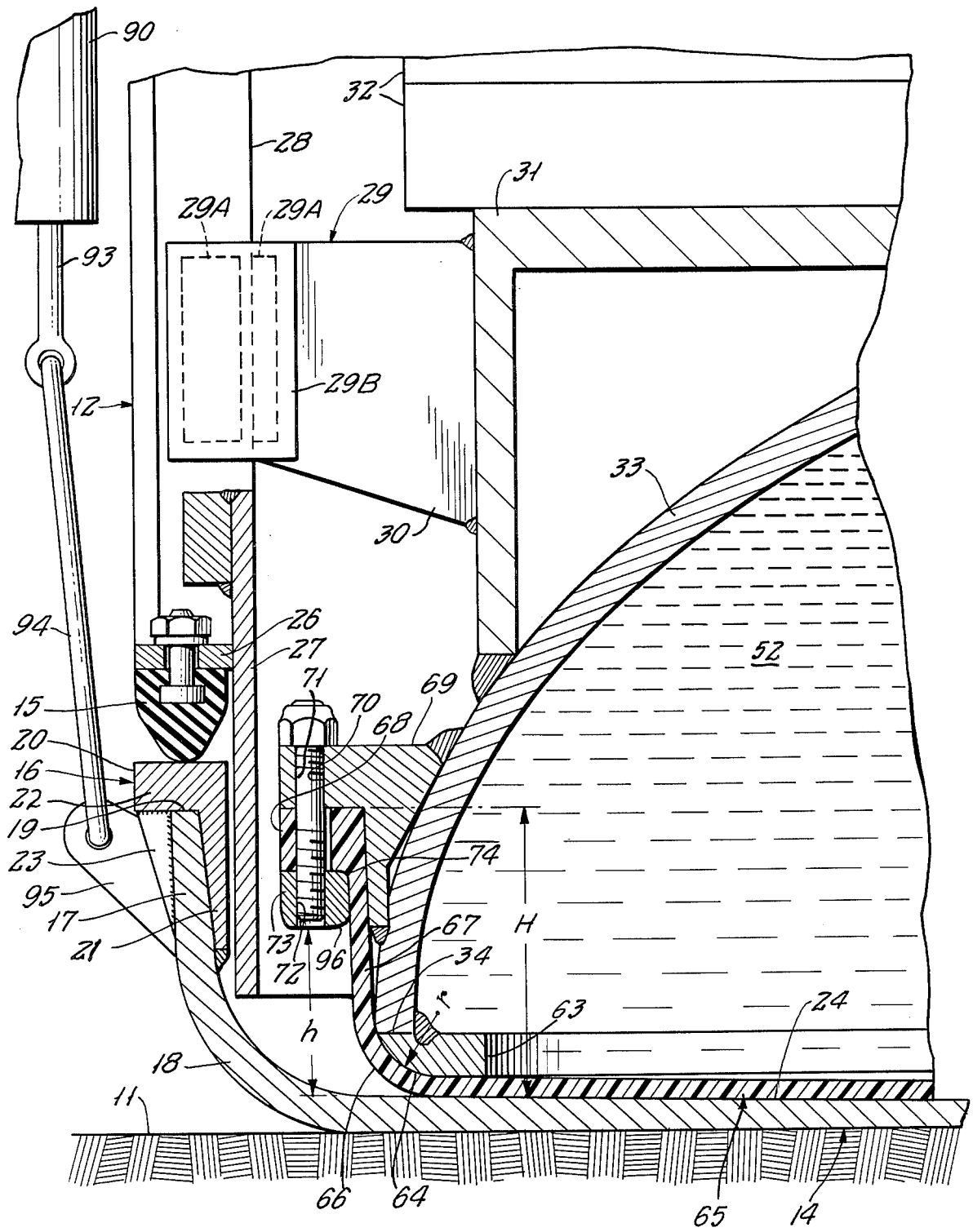
FIG. 3 is a view in enlarged scale of a portion of FIG. 1 showing the details of attaching the upper edge of the peripheral side wall portion of the cup-shaped diaphragm to an elevated flange on the exterior of the bell and also showing details of the metal pan.

The following detailed description of a presently preferred embodiment of the invention will be made with reference to the drawings wherein like reference symbols indicate the same parts throughout the various views.

As may be seen in FIGS. 1 and 2, a seismic energy land source for generating and transmitting seismic energy impulses is indicated generally at 10 positioned upon the surface of the earth 11. The land source 10 includes an outer cage-like frame 12 and an inner frame or main assembly 13. The weight of the outer frame 12, which may be augmented by the weight of a land vehicle that transports this apparatus to a desired site, preloads a steel pan 14 against the surface of the earth. The weight on the outer frame 12 acts through a plurality of resilient bumpers 15 which press down upon a reinforced rim 16 on an upwardly extending peripheral portion 17 of the metal pan. The pan 14 may be movably attached to the outer frame 12 by suitable attachment means, for example, such as a plurality of flexible stretchable straps (not shown).

The metal pan 14 as may be seen in greater detail in FIGS. 4 and 5 has a curved shoulder portion 18 which is the transition to the upturned periphery 17. The upturned periphery then tapers to its peripheral edge 19, as shown in FIGS. 4 and 5. As shown in FIG. 3, the reinforced rim 16 comprises an L-shaped ring member 20 having a longer vertical leg 21 welded to the inner surface of the upturned peripheral portion 17 and a shorter leg 22 which rests upon the peripheral edge 19 of the pan. A plurality of triangular reinforcing gussets 23 are welded at circumferentially spaced locations around the outer surface of the upturned peripheral portion 17, so that the upper edges of the gussets 23 support the shorter leg 22 of the L-shaped reinforcing member 20.

As seen in FIGS. 4 and 5, the bottom wall of the metal pan 14 may have its inner surface 24 tapering downwardly from the horizontal at an angle A which is in the range from approximately 0.5° to 1.5°. In this embodiment, the slope angle of taper A is shown in the range of approximately forty minutes to one degree. The lower surface of the bottom wall of this metal pan 14 extends horizontally between the rounded shoulder portion 18, as seen in FIG. 4. The inner pan surface 24 thus tapers inwardly and downwardly to the center 25 of the pan to produce a resultant thickness which is approximately one-half to two-thirds of the thickness at the rounded shoulder portion 18. In this embodiment, the thickness at the pan center 25 is in the range of approximately three-eighths to one-half of an inch, and the pan is shown three-fourths of an inch thick in the rounded shoulder region 18. The moderate reduction in thickness at the center of the pan reduces the pan mass and thereby enhances the transmission of seismic impulses into the earth. If desired for somewhat greater ruggedness, the pan bottom may be made of uniform thickness. However, my present preference is to provide a moderate tapering reduction in thickness as shown for facilitating the transfer of maximum seismic pulses into the earth for a given size of the land source 10.

The upturned tapered peripheral portion 17 reduces to a thickness of approximately one-half of an inch at its upper edge 19. As seen most clearly in FIG. 5, the outer surface of the peripheral wall portion 17 of the metal pan is vertical, and the inner surface 17a slopes outwardly in the direction for progressively reducing the wall thickness toward its upper edge 19. The inner surface 18a of the rounded shoulder portion 18 has a radius R of curvature which is relatively large, for example, of approximately 2½ inches. As seen in FIG. 4, the overall diameter D to the inside of the upper pan edge 19 is approximately 48 inches.

The bumpers 15, which are of a suitable resilient material such as a reinforced synthetic rubber, are bolted to a flange 26 on the lower portion of the outer frame 12. This outer frame also includes a cylindrical member 27 which guides vertical movement of the metal pan 14 relative to the frame 12.

Also included in the outer cage-like frame 12 are a plurality of spaced parallel vertical guide rails 28 for guiding respective slider shoe assemblies 29 held by brackets 30 secured to the side of a support platform 31 on the main assembly 13. The guide rails 28 are square in cross section. The slider shoe assemblies 29 each include three slide pads 29A (FIG. 3) engaging the inner surface and the two side surfaces, respectively, of each square rail. In this embodiment, the slide pads 29A are made of ultra high molecular weight polyethylene secured by steel retainers 29B (FIG. 3) mounted on the brackets 30. A plurality of strong heavy annular weights 32 of steel, or of lead or other very heavy material encased in steel, are supported on this platform 31.

Supporting platform 31 is mounted on the outer surface of a dome-shaped bell 33 which opens downwardly and has a lower rim 34. Extending upwardly from the dome 33 and from the center of the support platform 31 is a vertical cylindrical casing 35 which encloses a gas-liquid separator 36 having a plurality of baffles and passages therein for separating gas from liquid. A gas-liquid separator is described in detail in above-mentioned U.S. Pat. No. 3,779,335. The separator 36 is provided with an upwardly extending tubular cylindrical guide portion 37 having a vent 38 at the top to the atmosphere. The separator is provided with a return passage 39 for returning the separated liquid to the bell 33. This tubular guide portion 37 of the main assembly 13 is free to move vertically relative to the outer frame 12. There is a top guide ring 40 secured in the frame 12 which encircles the tubular guide 37 in sliding relationship therewith.

In the lower portion of the cylindrical casing 35, there is an inner cylindrical chamber 42 having provision for mounting an airgun. As shown in FIGS. 1 and 2, the chamber 42 has a mounting structure 44 at its lower end in which is mounted an airgun 46 having a plurality of discharge ports 48. This airgun 46 is provided with a firing solenoid 50 from which extends an electrical firing cable 51. The airgun may be of the type disclosed in U.S. Pat. No. 3,379,273 and which is capable of very suddenly releasing a large quantity of high-pressure gas through its discharge ports into liquid 52 confined within the bell 33 to generate powerful impulses therein. The liquid 52 may be any substantially incompressible liquid, for example, such as water. The pressurized gas which is used may be any suitable high-pressure gas, for example, such as compressed air, which is pressurized in the range from 1,500 to 2,500 pounds per square inch, and is supplied from the high-pressure receiver tank of a multi-stage high-pressure air compressor to the airgun 46 through a flexible high-pressure air hose line (not shown).

The upward reaction of the main assembly 13 may be slowed by a downwardly pressing air spring 54 comprising a cylinder 56 having its upper end pivotally connected at 57 to an air spring mount 58. The air cylinder 54 encloses a piston therein from which extends a piston rod 59 connected to the annular weights 32 of the main assembly 13. When this air spring 54 is used, a pressure relief valve is associated therewith to dissipate pressurized air from the air spring as the main assembly 13 is moving upwardly. Thus, the rise of air pressure in the air spring is limited to minimize the tendency to drive the main assembly 13 down again.

After upward motion of the main assembly 13 has been stopped, an hydraulic catch cylinder 60 having check valve means associated therewith prevents the main assembly 13 from crashing down against the ground which would generate secondary impulses in the earth. The hydraulic cylinder 60 has its upper end connected to a mount 61 at the top of the outer frame 12, and has a piston rod 62 extending therefrom also connected to the weights 32 of the main assembly 13. In lieu of using an air spring 54, the cylinder 56 and piston rod 59 may comprise a second hydraulic catch cylinder operating in parallel relationship with the other catch cylinder 60. This use of two catch cylinders is my presently preferred mode of employing the invention in a land source 10 of the structure as shown.

The bottom open end of the bell 33 has a ring shoe 63 (FIG. 3) welded to the rim 34, and this ring shoe is provided with an outwardly and downwardly facing rounded surface 64. This rounded surface 64 has a radius of curvature "r" of approximately 1 inch. A cup-shaped, tough, resilient, flexible elastomeric diaphragm 65 is normally positioned against the rounded surface 64. This cup-shaped diaphragm is shaped to have a rounded shoulder portion 66 whose inner surface is engageable against and has substantially the same radius as the rounded shoe surface 64. This rounded shoulder 66 forms a transition between the large generally horizontal diaphragm area and an upwardly extending peripheral side wall portion 67 on the upper edge of which is provided an enlarged flange 68. The total vertical distance "H" from the bottom surface of the diaphragm 65 near its rounded shoulder 66 to the upper face of the flange 68 is approximately 4¾ inches.

The upper face of this flange 68 is seated against an elevated flange 69 which is welded to the outer surface of the bell 33 at a level well above the lower rim 34 of the bell. This flange 69 is provided with a plurality of circumferentially spaced holes 70 through which extend studs 71 to be threaded into threaded openings 72 in a clamping ring 73 formed with a lower inner shoulder 74 which bears in and up against the underside of the flange 68. These studs pass through openings in the diaphragm flange 68. In this manner, the top of the peripheral side wall portion 67 of the diaphragm is clamped and firmly secured in position at the elevated level H above its bottom surface. It is pointed out that the cup-shaped diaphragm 65 passes around the rounded ring shoe 63 but is free from this ring shoe, so that the diaphragm is free to expand downwardly and outwardly away from the rounded shoe in the manner shown in FIG. 2.

This disclosed configuration of the diaphragm, which is preferably formed of a tough polyurethane material, significantly increased the operating life of the diaphragm by permitting its free downward and outward expansion. Further, this diaphragm provides for unimpeded transmission of very powerful seismic forces through itself and through the metal pan into the surface of the earth.

Advantageously, the tapered construction of the metal pan 14 reduces the mass of the pan in its central region. This reduction in mass enables the metal pan to become more rapidly accelerated downwardly for transmitting a very powerful seismic impulse down into the earth's surface 11 upon the firing of the airgun 46, as discussed above.

In FIG. 1, the apparatus 10 of the present invention is illustrated in its armed condition with the metal pan 14 being pressed down upon the ground. The airgun 46 within the water-filled bell 33 is charged by high-pressure compressed air in the range from approximately 1,500 to 2,500 pounds per square inch. The particular operating pressure which is used may vary somewhat from these values depending upon the operating crew.

When an electrical firing signal is sent over the cable 51 to the solenoid valve 50 on the airgun 46, the airgun is discharged to produce an abrupt release of high-pressure gas 78 (FIG. 2) through its discharge ports 48 into the confined liquid within the bell 33, as shown in FIG. 2. The sudden increase in pressure of the confined liquid abruptly expands the diaphragm 65 which, in turn, suddenly thrusts down powerfully on the metal pan 14 for transmitting a powerful seismic impulse through this metal pan into the earth. In most cases, as shown in FIG. 2, and depending upon the relative hardness of the earth's surface, the pan 14 is driven downwardly to some extent compressing the earth's surface 11 downwardly somewhat into the ground.

The upward section of the main assembly 13 resulting from the sudden discharge of the airgun may be opposed by the air spring 54. The cylinder 56 of the air spring is initially filled with an air at a regulated predetermined pressure in the range from approximately 30 to 250 p.s.i. gage. For example, a regulated air pressure of 50 p.s.i. gage may be used in the illustrative embodiment of the invention, as shown. Thus, the air spring 54 exerts an initial significant downward thrust on the main assembly 13 relative to the outer frame 12.

The upward motion of the inner frame 13 is guided by its slider shoe assemblies 29 engaging the guide rails 28 and by its tubular guide 37 sliding in the frame ring 40. After separation of the air or other gas from the liquid, the expanded air is vented into the atmosphere through the vent 38, and the liquid returns through passage 39 to the bell 33.

After upward motion of the main assembly 13 has been stopped, the hydraulic catcher cylinder 60, or two such catcher cylinders, prevent the main assembly from crashing down against the earth. A suitable hydraulic circuit arrangement for use with such a catcher cylinder is described in U.S. Pat. No. 3,779,335.

The reason for using one or two such catcher cylinders is that the desired powerful impulse was generated and transmitted upon the firing of the airgun and secondary impulses which would be caused by any such crashing impact of the main assembly against the earth are undesirable. Any such secondary impulses are undesirable since they would tend to confuse records being made by the use of a plurality of remotely located geophones. The geophones are coupled to the earth for receiving the seismic energy which has been reflected and/or refracted by sub-surface geologic strata and various other sub-surface structures in the earth and which then returns toward the surface of the earth where the geophones pick up the returning energy.

In order to prevent tilting of the pan into a misaligned position prior to firing, a plurality of pneumatic cylinders 90 (FIGS. 1 and 2) are provided. The upper end of each cylinder is connected by a pivot 91 to a bracket 92 secured to a respective guide rail 28. A piston rod 93 extends down from each cylinder and is connected by a length of cable or strong line 94 attached to a bracket 95 which is welded to the upturned peripheral portion of the pan 14. A flexible high pressure hose line (not shown) feeds compressed air into each pull-up cylinder 90 beneath the piston therein for exerting a forceful upward pull on the perimeter of the pan. It is advantageous to supply these pull-up cylinders 90 with compressed air at the same high pressure as is used to supply the airgun 46. Thus, a compact cylinder 90 of relatively small cross-sectional area, for example, of approximately ½ square inch, can be employed to provide a relatively large upward pull on the tension line 94. The upward pull of each of the lines 94 is approximately 500 to 1,000 pounds. Thus, if the operator inadvertently places the seismic energy land source down on the ground with a rock under the bottom of the pan near the curved shoulder portion 18 (FIGS. 4 and 5) and upward pulls of the tension lines 94 prevent the pan from cocking or tilting prior to firing. After the airgun is fired, downward motion of the pan 14 is accommodated as shown in FIG. 2, by extension of the piston rods 93.

It is possible to employ only two of said pull-up cylinders 90 to obtain successful results in preventing cocking of the metal pan prior to firing. When only two of the pull-up cylinders 90 are used, it is preferred to mount them in fore and aft positions diametrically opposite one another on the seismic energy land source 10. This fore-and-aft mounting is relative to the direction of travel of the vehicle on which the source 10 is transported. As a practical matter, the front and rear of the land source 10 are relatively more protected locations than are the sides thereof during transport and operation.

As indicated above, the rounded shoulder portion 66 (FIG. 3) of the cup-shaped elastomeric diaphragm 65 is free to expand outwardly and downwardly away from the rounded surface 64 of the rim shoe 63. The resultant outward and downward bulging of the rounded shoulder portion of the cup-shaped diaphragm can be seen in FIG. 2 during the transmission of a powerful seismic impulse into the earth.

In order to permit the outward expansion of the rounded shoulder 66 (FIG. 3) of the cup-shaped diaphragm, the adjacent region of the upturned diaphragm side wall 67 is allowed to expand outwardly away from the exterior of the bell. Thus, the lower surace of the clamp ring 73 is positioned at a significant distance "$h$" above the bottom of the diaphragm. It is an advantage to have this distance "$h$" at least equal to twice the radius "$r$" of the normal relaxed shaped of the inner surface of the rounded shoulder 66. In this illustrative embodiment "$r$" is one inch and, therefore, "$h$" is at least two inches, and as shown in the presently preferred mode in FIG. 3, "$h$" has a value of $2\frac{3}{4}$ inches. Moreover, the lower inner corner 96 of the clamp ring is rounded to accommodate the outward expansion of the diaphragm side wall 67.

It will be understood that this embodiment of the invention is susceptible to modification in order to adapt it to different conditions, and accordingly, it is desired to comprehend such modifications within the scope of the appended claims.

I claim:

1. In a seismic energy land source for surveying on the earth by transmitting seismic energy impulses into the earth and being of the type having a rigid dome-shaped bell vertically movable in a mounting frame for containing a substantially incompressible liquid such as water with at least one airgun for abruptly releasing pressurized gas into the liquid in the dome-shaped bell for generating said seismic impulses, said bell having a lower rim with a pan positioned below said lower rim for engaging the surface of the earth below said bell and mounted for upward and downward movement relative to said bell and relative to said mounting frame and with a cup-shaped tough, resilient, flexible elastomeric diaphragm extending across the bottom of said bell for retaining the liquid in said bell, said diaphragm being positioned above said pan and extending outwardly beyond said rim passing between said rim and said pan, said diaphragm having a rounded shoulder with an upturned peripheral side wall extending upwardly around the exterior of said bell, means for securing the upper edge of said upturned side wall of the diaphragm to the exterior of the bell, and said pan having an upwardly extending peripheral wall, improved apparatus for transmitting powerful seismic impulses into the earth comprising: a plurality of pneumatic pull-up cylinders each with a piston rod extending therefrom, each of said pull-up cylinders with its piston rod being connected between said mounting frame and said peripheral wall of the pan for exerting a forceful upward pull on the peripheral wall of said pan, the respective pull-up cylinders each with its piston rod being located at respective spaced positions on said peripheral wall, and means for feeding pressurized gas into each of said pull-up cylinders for exerting said forceful upward pull on the peripheral wall of the pan at said respective spaced positions for preventing cocking of the pan when said pan is in contact with the earth prior to the abrupt release of pressurized gas into said liquid.

2. In a seismic energy land source, improved apparatus for transmitting powerful seismic impulses into the earth as claimed in claim 1, in which said pull-up cylinders have relatively small bores of approximately one-half square inch and are supplied with high pressure pressurized gas at substantially the same pressure as that which is supplied to the airgun for exerting a relatively large upward pulling force on the peripheral wall of said pan.

3. In a seismic energy land source, improved apparatus for transmitting powerful seismic impulses into the earth as claimed in claim 1, in which each of said pull-up cylinders exerts a forceful upward pulling force of at least 500 pounds on the peripheral wall of said pan.

4. In a seismic energy land source for surveying on the earth by transmitting seismic energy impulses into the earth and being of the type having a rigid dome-shaped bell for containing a substantially incompressible liquid such as water with at least one airgun for abruptly releasing pressurized gas into the liquid in the dome-shaped bell for generating said seismic impulses, said bell having a lower rim with a metal pan positioned below said lower rim for engaging the surface of the earth below said bell and mounted for upward and downward movement relative to said bell and with a cup-shaped tough, resilient, flexible elastomeric diaphragm having a bottom wall extending across the bottom of the bell for retaining the liquid in said bell, said diaphragm being positioned above said pan and extending outwardly beyond said rim passing between said rim and said pan, said diaphragm having a rounded shoulder with an upturned peripheral side wall extending upwardly around the exterior of said bell the improved apparatus for transmitting powerful seismic impulses into the earth comprising: a mounting flange encircling said bell and secured to the exterior of said bell at an elevated level, said mounting flange extending outwardly from said bell and having a lower surface positioned at an elevated level H at least 4 inches above the lower surface of the bottom wall of said diaphragm, said peripheral side wall of said diaphragm having an outwardly extending diaphragm flange on the upper edge thereof, said diaphragm flange being positioned up against said lower surface of said mounting flange, a clamp ring encircling said peripheral side wall of the diaphragm and being positioned up against said diaphragm flange, fastening means securing said clamp ring to said mounting flange for holding said diaphragm flange up against said mounting flange, and the bottom of said clamp ring being at an elevated level at least 2 inches above the lower surface of the bottom wall of said diaphragm for permitting the region of said peripheral side wall of said diaphragm below said clamp ring to expand outwardly away from the exterior of the bell when said pressurized gas is abruptly released into the liquid in said bell.

5. In a seismic energy land source for surveying on the earth by transmitting seismic energy impulses into the earth and being of the type having a rigid dome-shaped bell for containing a substantially incompressible liquid such as water with at least one airgun for abruptly releasing high pressure pressurized gas into the liquid in the dome-shaped bell for generating said seismic impulses, said bell having a lower rim with a pan positioned below said lower rim for engaging the surface of the earth below said bell, said pan being movably mounted in said land source for downward and upward movement relative to said bell, said pan having a peripheral wall extending upwardly around said bell with a tough, resilient, flexible elastomeric diaphragm extending across the bottom of said bell above said pan for retaining the liquid in said bell, said elastomeric diaphragm being cup-shaped and having an upturned peripheral side wall extending upwardly around the exterior of the bell, the improved apparatus for transmitting powerful seismic impulses into the earth comprising: an elevated mounting flange fixed to the exterior of said bell, said elevated mounted flange extending outwardly from said bell and having a lower surface positioned at an elevated level H significantly above the bottom of said diaphragm, said diaphragm side wall having an upper edge with an enlargement thereon forming a diaphragm flange, said diaphragm flange being positioned up against the lower surface of said mounting flange, a clamping ring encircling said diaphragm side wall and being positioned up against said diaphragm flange, and fastening means for securing said clamping ring up against said diaphragm flange for clamping said diaphragm flange up against the lower surface of said mounting flange.

6. In a seismic energy land source, improved apparatus for transmitting powerful seismic impulses into the earth as claimed in claim 5, in which said upwardly extending peripheral wall of said pan tapers to a thinner wall thickness toward the upper edge thereof.

7. In a seismic energy land source as claimed in claim 5, wherein the upwardly extending peripheral wall of the pan is connected to the bottom wall of the pan by a rounded shoulder portion, improved apparatus transmitting powerful seismic impulses into the earth in which: the bottom wall of said pan has a decreasing wall thickness from its said rounded shoulder portion toward the center of the pan.

8. In a seismic energy land source, improved apparatus transmitting powerful seismic impulses into the earth as claimed in claim 7, in which the lower surface of the bottom wall of said pan extends horizontally inwardly from the rounded shoulder to the center of the pan, and the upper surface of said pan wall slopes inwardly and downwardly from said shoulder portion to the center of the pan.

9. In a seismic energy source, improved apparatus transmitting powerful seismic impulses into the earth as claimed in claim 7, wherein the bottom wall thickness of the pan at the center thereof is approximately one-half the wall thickness at the rounded shoulder portion thereof.

10. In a seismic energy land source as claimed in claim 5, wherein an outer frame is positionable down upon the periphery of said pan, said pan being movable with respect thereto, said bell being movably mounted in said outer frame, airspring means are operatively interactive between said outer frame and said bell for opposing the upward movement of said bell with respect to said outer frame after the pressurized gas has been abruptly released from said airgun into the liquid in said bell, said air spring means including a cylinder having one end connected to said outer frame and a slidable piston therein having a piston rod extending outwardly of said cylinder and operatively connected to said bell, improved apparatus for transmitting powerful seismic impulses into the earth comprising pressure relief valve means connected to said air spring cylinder for relieving the pressure in said cylinder as said bell moves upwardly relative to said outer frame for dissipating the energy of the upward movement of said bell.

11. In a seismic energy land source for surveying on the earth by transmitting seismic energy impulses into the earth and being of the type having a rigid dome-shaped bell for containing a substantially incompressible liquid such as water with at least one airgun for abruptly releasing high pressure pressurized gas into the liquid in the dome-shaped bell for generating said seismic impulses, said bell having a lower rim with a pan positioned below said lower rim for engaging the surface of the earth below said bell, said pan being movably mounted in said land source for downward and upward movement relative to said bell, said pan having a peripheral side wall extending upwardly around said bell with a tough, resilient, flexible elastomeric diaphragm having a bottom extending across below said bell and above said pan for retaining liquid in said bell, said elastomeric diaphragm being cup-shaped and having a rounded shoulder connecting the bottom of the diaphragm with an upturned peripheral side wall extending upwardly around the exterior of said bell, the improved apparatus for transmitting powerful seismic impulses into the earth comprising: an elevated mounting flange fixed to the exterior of said bell and extending outwardly from said bell, said elevated mounting flange having a lower surface positioned at an elevated level H significantly above the bottom of said diaphragm, said peripheral side wall of the diaphragm having an upper edge with an enlargement projecting outwardly therefrom forming a diaphragm flange, said diaphragm flange being positioned up against the lower surface of said mounting flange, a clamping ring encircling said peripheral side wall of the diaphragm and being positioned up against said diaphragm flange, fastening means for securing said clamping ring up against said diaphragm flange for clamping said diaphragm flange up against the lower surface of said mounting flange, a shoe having a ring configuration and extending around on the rim of said bell, said ring shoe having a rounded outwardly and downwardly facing surface engageable with the interior of the rounded shoulder of said cup-shaped diaphragm, and said rounded shoulder of said diaphragm being expandable outwardly and downwardly away from said ring shoe and the adjacent region of said upturned peripheral side wall of the diaphragm being expandable outwardly away from the exterior of the dome-shaped bell when the pressurized gas is abruptly released into the liquid in said bell.

12. In a seismic energy land source, the improved apparatus for transmitting powerful seismic impulses into the earth as claimed in claim 11, in which: the lower surface of said clamp ring is also positioned a significant elevated distance $h$ above the bottom of said diaphragm for permitting the region of said upturned side wall below said clamp ring to expand outwardly away from the exterior of the bell.

13. In a seismic energy land source, improved apparatus for transmitting powerful seismic impulses into the earth as claimed in claim 12 in which said elevated distance "$h$" is at least twice the radius "$r$" of the inner surface of the rounded shoulder of said cup-shaped diaphragm.

14. In a seismic energy land source, improved apparatus for transmitting powerful seismic impulses into the earth as claimed in claim 13, in which said elevated distance "$h$" is at least 2 inches.

15. In a seismic energy land source for surveying on the earth by transmitting seismic energy impulses into the earth and being of the type having a rigid dome-shaped bell for containing a substantially incompressible liquid such as water with at least one airgun for abruptly releasing high pressure pressurized gas into the liquid in the dome-shaped bell for generating said seismic impulses, said dome-shaped bell being movably mounted in an upright mounting frame for upward and downward movement of the bell relative to said mounting frame, said bell having a lower rim with a metal pan positioned below said lower rim for engaging the surface of the earth below said bell, said pan being movably mounted in said mounting frame for upward and downward movement relative to said bell and mounting frame, said pan having a peripheral wall extending upwardly around said bell, and an elastomeric diaphragm extending across the bottom of said bell above said pan for retaining the liquid in said bell, the improved apparatus for transmitting powerful seismic impulses into the earth comprising: a plurality of pneumatic pull-up cylinders each with a piston rod extending therefrom, each of said pull-up cylinders with its piston rod being connected between said mounting frame and said peripheral wall of the pan for exerting an upward pull on said peripheral wall, said pull-up cylinders with their piston rods being respectively located at a plurality of positions spaced about said peripheral wall, and means for feeding pressurized gas into each of said pull-up cylinders for exterting a forceful upward pull on the periphery of said pan at said plurality of positions for preventing tilting of the pan when said pan is in contact with an eccentrically located rock on the earth prior to the abrupt release of the high pressure pressurized gas into said liquid.

16. In a seismic energy land source, improved apparatus for transmitting powerful seismic impulses into the earth as claimed in claim 15, in which: said pneumatic pull-up cylinders are supplied with high presure pressurized gas at substantially the same pressure as that which is supplied to the airgun for exerting a relatively large upward pulling force on said peripheral wall of the pan.

17. In a seismic energy land source, improved apparatus for transmitting powerful seismic impulses into the earth as claimed in claim 16, in which: each of said pull-up cylinders exerts a forceful upward pulling force of at least 500 pounds on said peripheral wall of the pan.

18. In a seismic energy land source for surveying on the earth by transmitting seismic energy impulses into the earth and being of the type having a rigid dome-shaped bell for containing a substantially incompressible liquid such as water with at least one airgun for abruptly releasing high pressure pressurized gas into the liquid in the dome-shaped bell for generating said seismic impulses, said dome-shaped bell being movably mounted in an upright mounting frame for upward and downward movement of the bell relative to said mounting frame, said bell having a lower rim with a metal pan positioned below said lower rim for engaging the surface of the earth below said bell, said pan being movably mounted in said mounting frame for upward and downward movement relative to said bell and mounting frame, said pan having a rounded shoulder portion with a peripheral wall extending upwardly from said rounded shoulder portion around said bell, and an elastomeric diaphragm extending across the bottom of said bell above said pan for retaining the liquid in said bell, the improved apparatus for transmitting powerful seismic impulses into the earth comprising: said metal pan having a tapered bottom wall decreasing in wall thickness from said rounded shoulder portion toward the center of said bottom wall.

19. In a seismic energy land source improved apparatus for transmitting powerful seismic impulses into the earth as claimed in claim 18, in which: the bottom wall thickness of said pan at the center thereof is from one-half to two-thirds of the thickness at the rounded shoulder portion thereof.

20. In a seismic energy land source improved apparatus for transmitting powerful seismic impulses into the earth as claimed in claim 18, in which: said peripheral side wall of said pan is tapered in thickness decreasing from said rounded shoulder portion assembly.

* * * * *